US009410740B2

(12) United States Patent
Yu et al.

(10) Patent No.: US 9,410,740 B2
(45) Date of Patent: Aug. 9, 2016

(54) BAKING TRANSMISSION MECHANISM

(71) Applicants: SHENZHEN FUTAIHONG PRECISION INDUSTRY CO., LTD., Shenzhen (CN); FIH (Hong Kong) Limited, Kowloon (HK)

(72) Inventors: Fei Yu, Shenzhen (CN); Jian-Ping Jin, Shenzhen (CN); Bing Yu, Shenzhen (CN)

(73) Assignees: SHENZHEN FUTAIHONG PRECISION INDUSTRY CO., LTD., Shenzhen (CN); FIH (Hong Kong) Limited, Kowloon (HK)

( * ) Notice: Subject to any disclaimer, the term of this patent is extended or adjusted under 35 U.S.C. 154(b) by 350 days.

(21) Appl. No.: 14/034,576

(22) Filed: Sep. 24, 2013

(65) Prior Publication Data

US 2014/0086710 A1 Mar. 27, 2014

(30) Foreign Application Priority Data

Sep. 25, 2012 (CN) .................... 2012 2 04923144 U

(51) Int. Cl.
*B65G 15/00* (2006.01)
*F26B 15/00* (2006.01)
*F26B 15/06* (2006.01)

(52) U.S. Cl.
CPC ................. *F26B 15/00* (2013.01); *F26B 15/06* (2013.01)

(58) Field of Classification Search
CPC ....................................................... B65G 21/08
USPC ....................................... 198/408, 778, 860.2
See application file for complete search history.

(56) References Cited

U.S. PATENT DOCUMENTS

| | | | | | |
|---|---|---|---|---|---|
| 1,334,025 | A * | 3/1920 | Laurence | A21C 13/02 | 198/576 |
| 1,523,971 | A * | 1/1925 | Johnsen | B65G 17/32 | 198/709 |
| 3,360,097 | A * | 12/1967 | Huffman et al. | B65G 47/82 | 198/429 |
| 4,184,588 | A * | 1/1980 | Lapeyre | A21C 13/02 | 198/778 |
| 4,579,218 | A * | 4/1986 | Park | B65G 21/18 | 198/778 |
| 4,848,537 | A * | 7/1989 | Richards | B65G 1/133 | 198/778 |
| 5,329,916 | A * | 7/1994 | Lygum | A21B 1/48 | 126/20.1 |

* cited by examiner

*Primary Examiner* — William R Harp
(74) *Attorney, Agent, or Firm* — ScienBiziP, P.C.

(57) ABSTRACT

A baking transmission mechanism includes a dustproof assembly, which includes a box, a main transport wheel, and a drive unit. The first transportation assembly includes a first oven assembly, a first feed wheel, a first discharge wheel, a first pulley assembly, and a second pulley assembly. The first feed wheel and the first discharge wheel are located at a top of the first oven assembly, and the first pulley assembly and the second pulley assembly are located at opposite sides of the first oven assembly. The second transportation assembly includes a second oven assembly, a second feed wheel, a second discharge wheel, and a third pulley assembly, wherein the second feed wheel and the second discharge wheel are located at a top of the second oven assembly, and the third pulley assembly is adjacent to the second pulley assembly.

11 Claims, 4 Drawing Sheets

BAKING TRANSMISSION MECHANISM

BACKGROUND

1. Technical Field

The present disclosure relates to a baking transmission mechanism

2. Description of Related Art

When housings of mobile phones and electronic devices are painted by a spraying apparatus, they are baked by a baking transmission apparatus. Transfer apparatuses are used for transferring a large number of workpieces at a fixed speed for spraying and baking. However, it is not suitable for transferring a small batch of workpieces.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
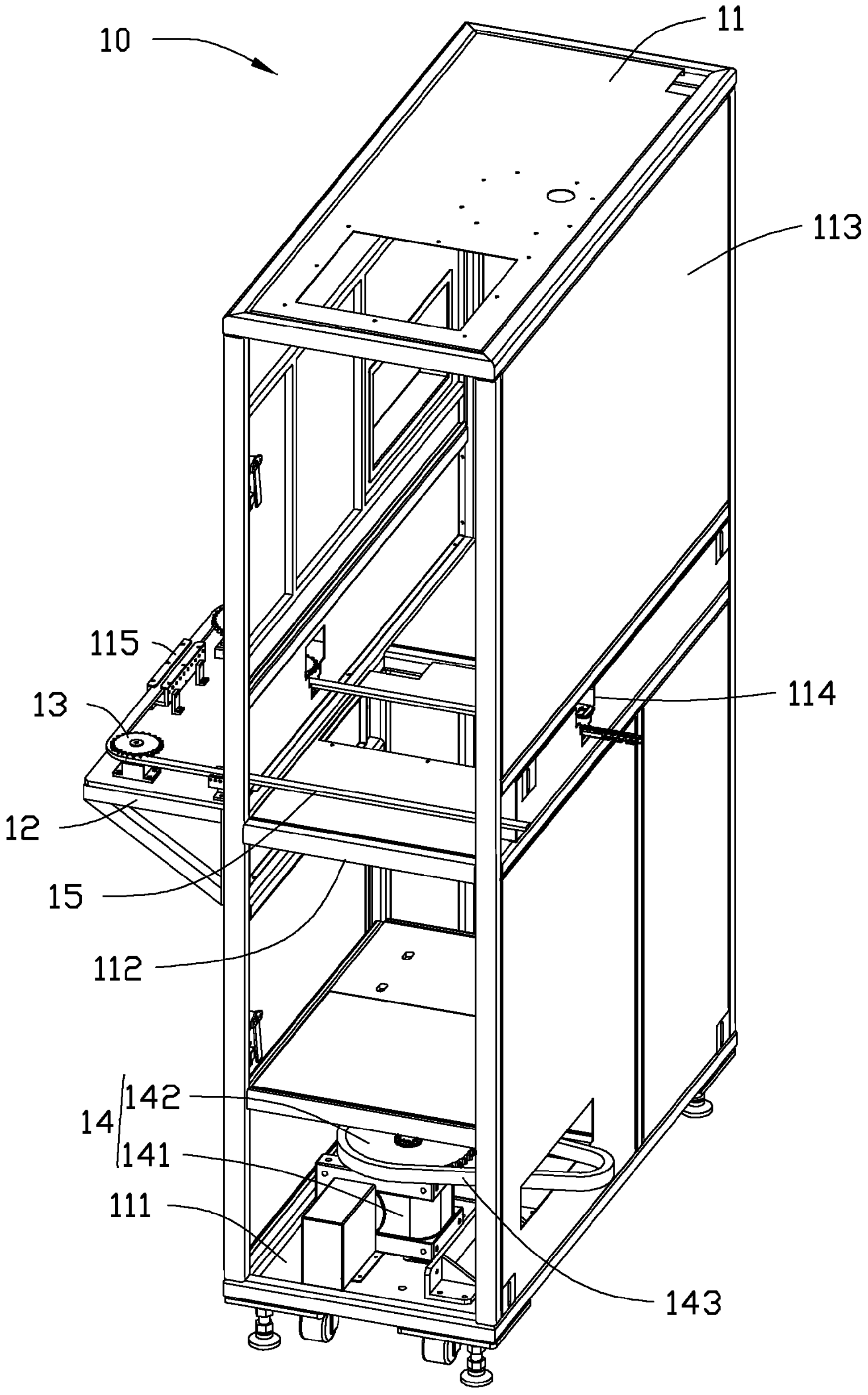
FIG. 1 is a schematic view of a baking transmission mechanism.
Figure 4:
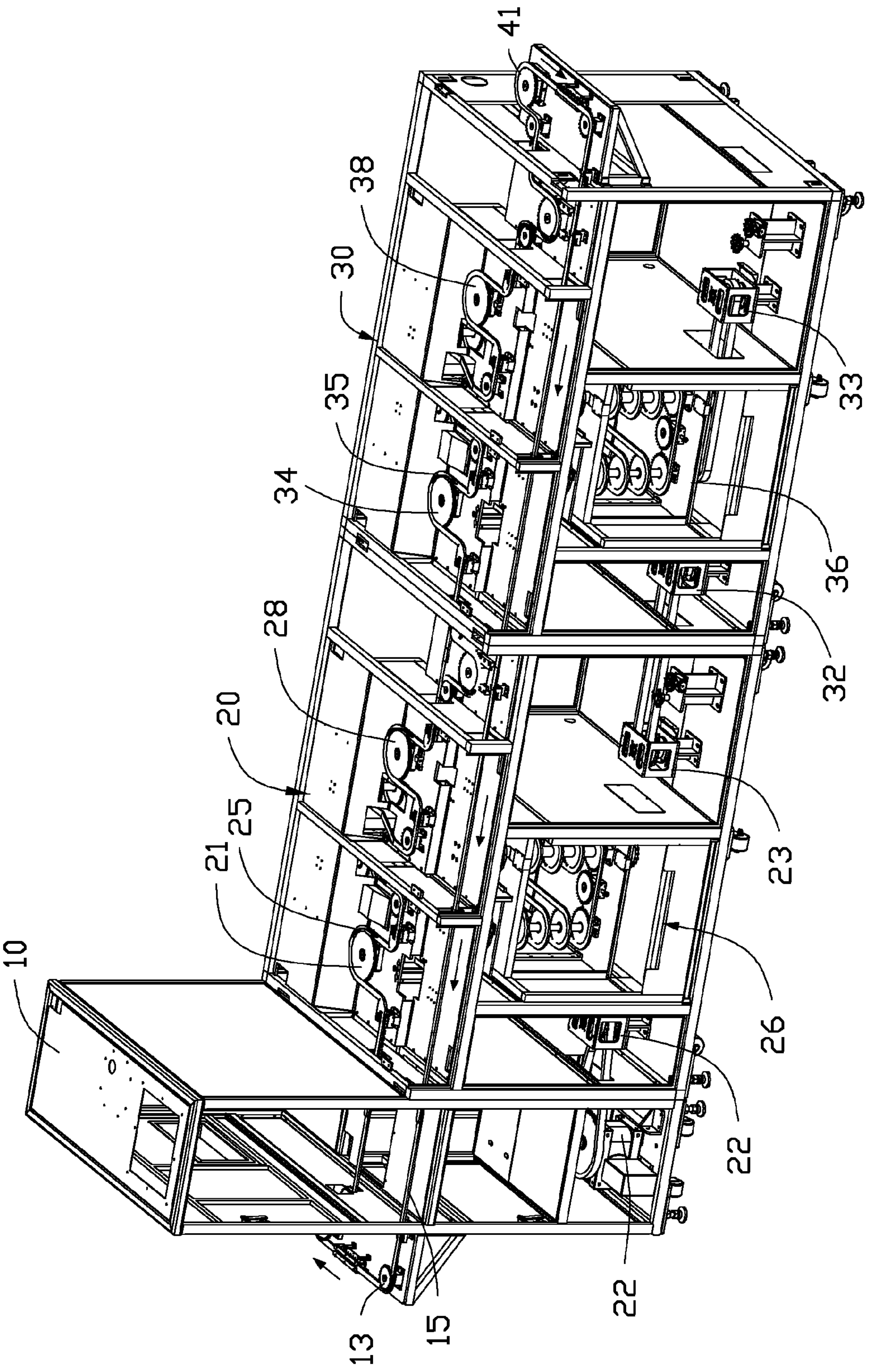
FIG. 4 is a schematic view of a second transportation assembly of the baking transmission mechanism shown in FIG. 1.

Referring to FIG. 1 and FIG. 4, a baking transmission mechanism is used for transmitting small products for baking. The baking transmission mechanism includes a dustproof assembly 10, a main conveyor belt (not labeled), a first transportation assembly 20, and a second transportation assembly 30. The main conveyor belt includes a first conveyor belt portion 15, a second conveyor belt portion 25, and a third conveyor belt portion 35. The first conveyor belt portion 15 is a portion of the main conveyor belt located in the dustproof assembly 10. The second conveyor belt portion 25 is a portion of the main conveyor belt located in the first transportation assembly 20. The third conveyor belt portion 35 is a portion of the main conveyor belt located in the second transportation assembly 30. The first transportation assembly 20 is mounted between the dustproof assembly 10 and the second transportation assembly 30, and the second conveyor belt portion 25 is connected to the first conveyor belt portion 15 and the third conveyor belt portion 35.

The dustproof assembly 10 includes a box 11, a support table 12, two main transport wheels 13, and a driving module 14. The box 11 includes a bottom plate 111, a separator 112, and two side plates 113. The bottom plate 111 and the separator 112 are spaced apart and are connected between the two side plates 113. Each of the side plates 113 defines two holes 114. The support table 12 is mounted on one of the side plates 113. One end of the support table 12 has a limit portion 115 for preventing the first conveyor belt portion 15 from deflection. The two main transport wheels 13 are respectively fixed adjacent to opposite ends of the supporting table 12. The first conveyor belt portion 15 passes through the limit portion 115 and wraps around the two main transport wheels 13. The two main transport wheels 13 rotate along a same direction to drive the first conveyor belt portion 15 to move. Two ends of the first conveyor belt portion 15 pass through the holes 114, respectively, and are respectively connected to one end of the second conveyor belt portion 25 and one end of the third transport belt portion 35 (Referring to FIG. 4). The driving module 14 includes a drive motor 141 and a main drive wheel 142. The drive motor 141 is mounted on the bottom plate 111 of the box 11. The main drive wheel 142 is mounted on the drive motor 141 and is driven by the drive motor 141. The main drive wheel 142 has a main drive belt 143 protruding out of the box 11 from one of the side plates 113.

Figure 2:
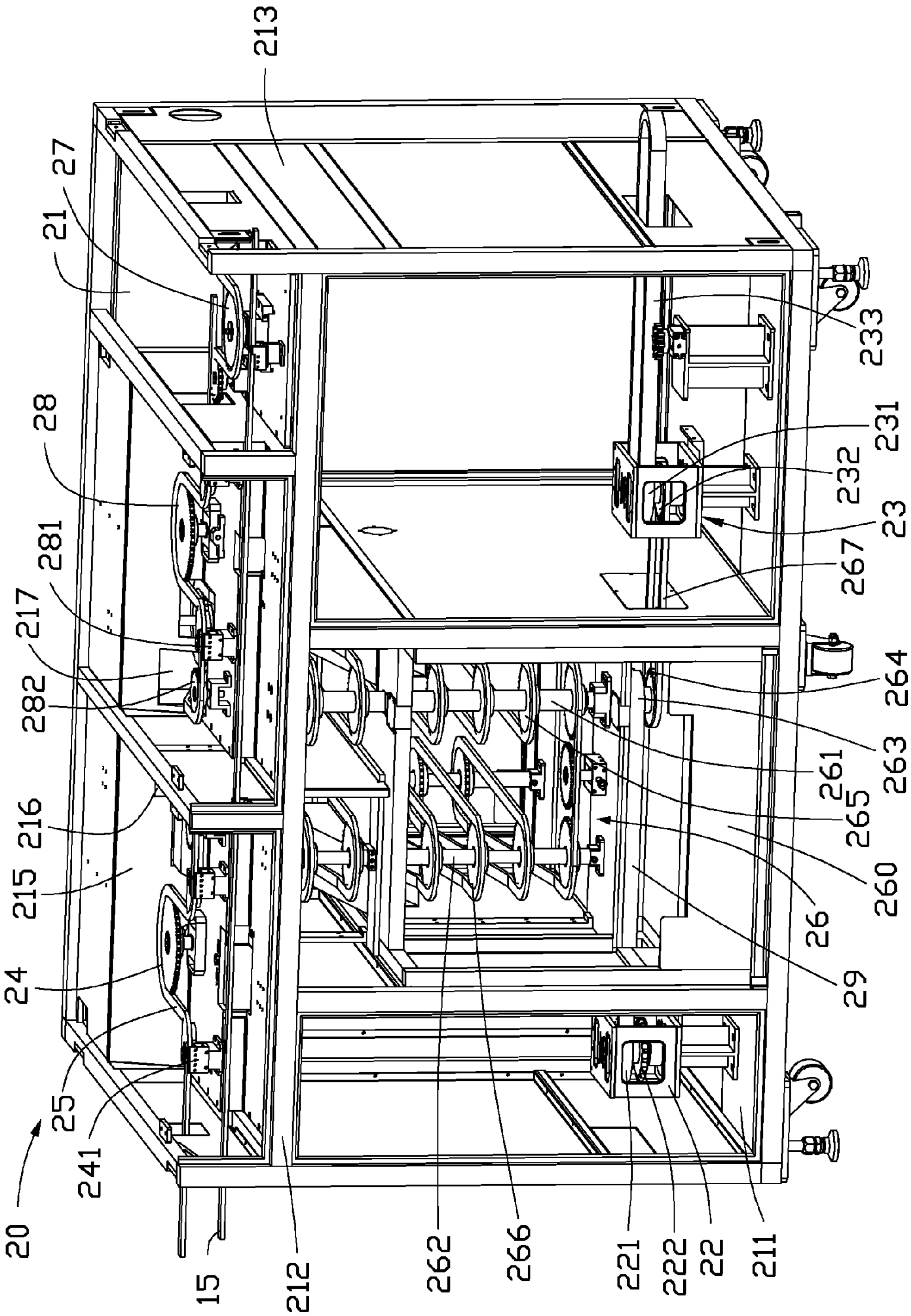
FIG. 2 is a schematic view of a dustproof assembly of the baking transmission mechanism shown in FIG. 1.

Referring to FIG. 2, the first transportation assembly 20 includes a first box 21, a first pulley assembly 22, a second pulley assembly 23, a first feed wheel 24, a first discharge wheel 28, a first oven assembly 26 and a connection wheel 27. The first box 21 includes a first bottom wall 211, a first top wall 212 opposite to the first bottom wall 211, and two first side walls 213. The two first side walls 213 are connected between the first bottom wall 211 and the first top wall 212. The first pulley assembly 22 is mounted to one of the first side walls 213, and includes an upper pulley 221 and a lower pulley 222 coaxially arranged with the upper pulley 221. The lower pulley 222 connects to the main drive belt 143 extending out of the box 11. The second pulley assembly 23 is mounted to the other first side wall 213. The second pulley assembly 23 has a same structure as the first pulley assembly 22, and includes an upper drive pulley 231 and a lower drive pulley 232.

The first oven assembly 26 is mounted to the first bottom wall 211 between the first pulley assembly 22 and the second pulley assembly 23. The first oven assembly 26 includes a first oven 260, a first main driving shaft 261, three first driven shafts 262, and a first transmission belt 29. The first oven 260, the main driving shaft 261 and the first driven shafts 262 are located between the first bottom wall 211 and the first top wall 212. The workpiece enters into the first oven assembly 26 from first feed opening 216 and is disposed on first transport belt portion 25. Therefore, the workpiece can be baked in the first oven 260. The first main driving shaft 261 includes a first rotation wheel 263 and a first driving wheel 264. The first transmission belt 29 is wrapped around the first rotation wheel 263 and the upper pulley 221.

The first main driving shaft 261 has a plurality of rotating wheels 265. The first driven shafts 262 is provided with a plurality of rotating wheels 266. The first main driving shaft 261 and one of the first driven shafts 262 are located opposite to each other to form a first discharge and transmission mechanism. Additionally, the other two first driven shafts 262 are located opposite to each other to form a first feeding and transmission mechanism. The rotating wheels 265 of the first main driving shaft 261 and the rotating wheels 266 of the first driven shafts 262 are staggered to each other. The first feed wheel 24 and the first discharge wheel 28 are mounted on the first top wall 212 and are spaced from each other. A baffle 215 is positioned at one side of the first top wall 212. The baffle 215 defines a first feed opening 216 and a first discharge opening 217. The first feed opening 216 and the first discharge opening 217 are located between the first feed wheel 24 and the first discharge wheel 28. The first top wall 212 has a divert wheel 282. The divert wheel 282 is located opposite to the first discharge opening 217. Two positioning frames 241 are located adjacent to the first feed wheel 24 for guiding the second conveyor belt portion 25. Two positioning frames 281 are located adjacent to the first discharge wheel 28.

One end of the second conveyor belt portion 25 extending out of one of the side walls 213 is connected to one end of the first conveyor belt portion 15. The other end of the second conveyor belt portion 25 passes through the positioning frames 241 to wind around the first feed wheel 24. The divert wheel 282 drives the second conveyor belt portion 25 to pass through the first feed opening 216. Thus, the second conveyor belt portion 25 winds around the rotating wheels 266 of two first driven shafts 262. After the second conveyor belt portion 25 winds around the rotating wheels 266 of the first feeding and transmission mechanism, the second conveyor belt portion 25 winds around the rotating wheels 265 of the first discharge and transmission mechanism in the same manner and then passes through the first discharge opening 217. The second conveyor belt portion winds around the divert wheel 282. The second conveyor belt portion 25 then passes through the positioning frames 281 to wind around the first discharge wheel 28 and the connection wheel 27, and then extends out of the other sidewall 213 into the second transportation assembly 30. The first driving wheel 264 of the first main driving shaft 261 is connected to the lower drive pulley 232 via a first transmission convection belt 267 coiling around the first driving wheel 264 and the lower drive pulley 232. A second transmission belt 233 is wrapped around the upper drive pulley 231 of the second pulley assembly 23.

Figure 3:
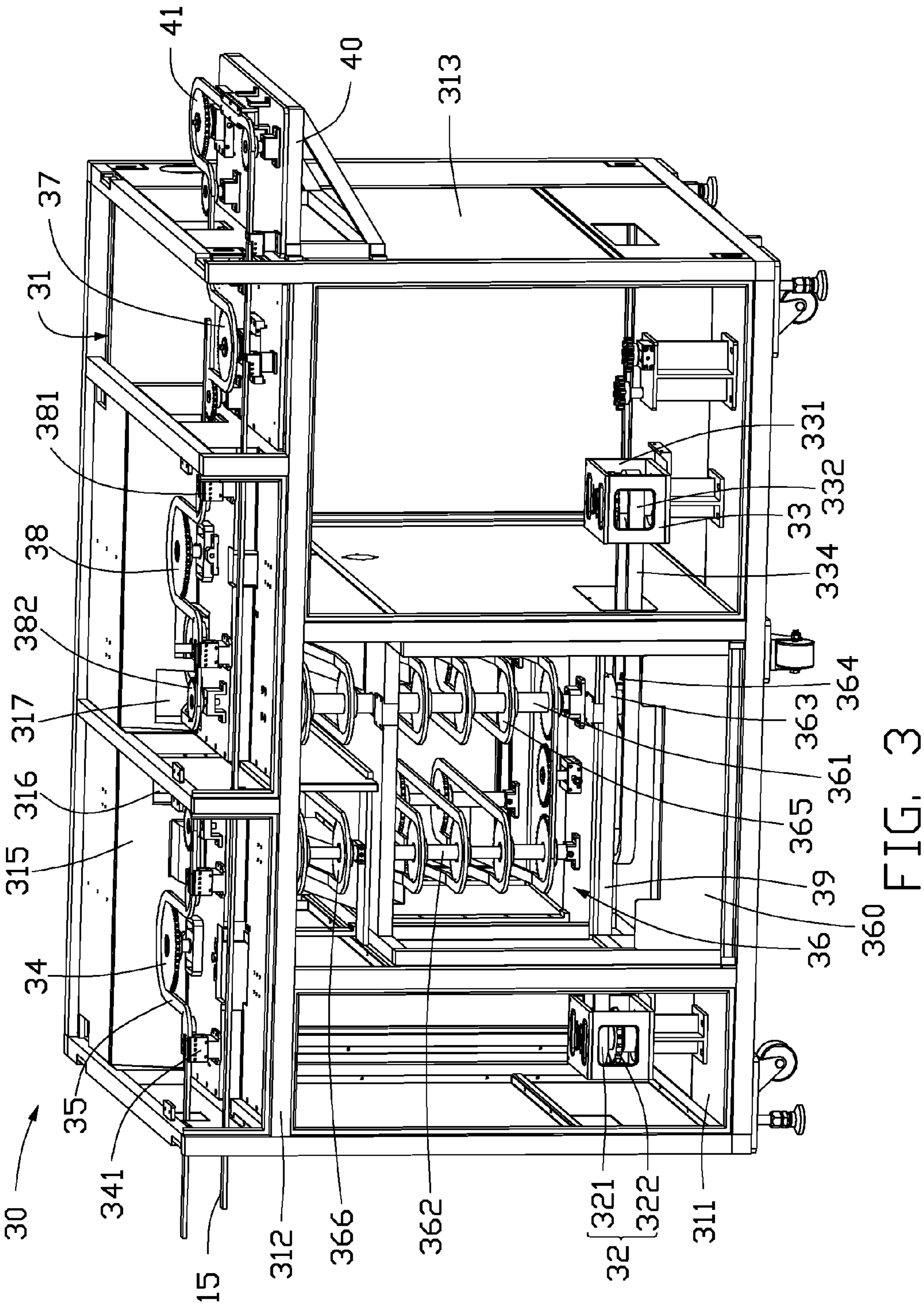
FIG. 3 is a schematic view of a first transportation assembly of the baking transmission mechanism shown in FIG. 1.

Referring to FIG. 3, the second transportation assembly 30 has substantially a same structure as the first transportation assembly 20. The second transportation assembly 30 includes a second housing 31, a third pulley assembly 32, a fourth pulley assembly 33, a second feed wheel 34, a second oven assembly 36, a coupling wheel 37, and a second discharge wheel 38. The second housing 31 includes a second bottom wall 311, a second top wall 312 opposite to the second bottom wall 311, and two second side walls 313. The third pulley assembly 32 is mounted on the second bottom wall 311 adjacent to one of the second side walls 313, and includes an upper pulley 321 and a lower pulley 322 coaxially connected to the upper pulley 321. The lower pulley 322 is connected to one end of the second transmission belt 233 of the second pulley assembly 23. The fourth pulley assembly 33 is mounted on the second bottom wall 311 adjacent to the other side wall 313. The fourth pulley assembly 33 has substantially a same structure as the third pulley assembly 32, and includes an upper drive pulley 331 and a lower drive pulley 332.

The second oven assembly 36 is mounted on the second bottom wall 311 between the third pulley assembly 32 and the fourth pulley assembly 33, and includes a second oven 360, a second main driving shaft 361, three second driven shafts 362, and a third transmission belt 39. The second oven 360, the second main driving shaft 361 and the three second driven shafts 362 are located between the second bottom wall 311 and a second top wall 312. The workpiece enters into the second oven assembly 36 from second feed opening 316 and is disposed on third transport belt portion 35 Therefore, the workpiece can be baked in the second oven 360. One end of the second main driving shaft 361 has a second rotation wheel 363 and a second drive wheel 364. The second rotation wheel 363 and the second drive wheel 364 are located adjacent to the second bottom wall 311. The second drive wheel 364 and the fourth pulley assembly 33 are provided with a movable belt 334. The third transmission belt 39 is wrapped around the second rotation wheel 363 and the upper pulley 321. The second main driving shaft 361 has a plurality of wheels 365, and the second driving shafts 362 have a plurality of wheels 366. The second main driving shaft 361 and one of the second driven shafts 362 are located opposite to each other to form a second discharge and transmission mechanism. The other two second driven shafts 362 are located opposite to each other to form a second feed and transmission mechanism. The second feed wheel 34 and the second discharge wheel 38 are mounted on the second top wall 312 and are spaced from each other. The second top wall 312 includes a baffle 315. The baffle 315 defines a second feed opening 316 and a second discharge opening 317. The second feed opening 316 and the second discharge opening 317 are defined between the second feed wheel 34 and the second discharge wheel 38. The top wall 312 has a divert wheel 382. The divert wheel 382 is located opposite to the second discharge opening 317. Two positioning frames 341 are mounted on the top wall 312 adjacent to the second feed wheel 34, and two positioning frames 381 are mounted adjacent to the second discharge wheel 38. A bracket 40 is mounted outside a sidewall 313 of the second oven assembly 36. Two discharge wheels 41 are mounted on the bracket 40.

A first end of the third transport belt portion 35 extending out of one of the side walls 313 is connected to one end of the second conveyor belt portion 25. A second end of the third transport belt portion 35 passes through the positioning frames 341 and the second feed wheel 34, and is driven by the divert wheel 382 to pass through the second feed opening 316. The third transport belt portion 35 wraps around the wheels 366 of two second driven shafts 362 of the second feed and transmission mechanism. The third conveyor belt portion 35 then wraps around the wheels 365 of the second discharge and transmission mechanism in the same manner and then passes through the second discharge opening 317. The third conveyor belt portion 35 then passes through the positioning frames 381 and wraps around the second discharge wheel 38 and the connection wheel 37, and lastly passes out of the other sidewall 313. The third conveyor belt portion 35 wraps around the two discharge wheels 41 to connect with one end of the first conveyor belt portion 15, so that the second conveyor belt portion 25 is connected with the first conveyor belt portion 15 and the third transport belt portion 35 to form the main conveyor belt. The transmission belt 334 is wrapped around the first drive wheel 364 and the lower drive pulley 332.

In use, a workpiece (not shown) is mounted on the first transport belt portion 15 of the main conveyor belt, and the baking transmission mechanism is started. The main drive wheel 142 is driven by the drive motor 141 to rotate to move the main drive belt 143 to move. The main drive belt 143 rotates the lower pulley 222 of the first pulley assembly 22, and the lower pulley 222 rotates the upper pulley 221 to move the first belt 29. The first belt 29 rotates the first rotation wheel 263, causing the first main driving shaft 261 and the first driven shafts 262 to rotate simultaneously.

The main conveyor belt carries the workpiece from the first feed opening 216 into the first feed and transmission mechanism. That is, the main conveyor belt is transmitted two driven shafts 262. Then, the main conveyor belt is transmitted by the first discharge and transmission mechanism. That is, the main conveyor belt is transmitted by the first driving shaft 261 and then by the other one driven shaft 262. When the main conveyor belt carries workpiece passed the first feed and transmission mechanism and the first discharge and transmission mechanism, the workpiece located above the first oven 260 can be baked by the first oven 260. Then, the first discharge and transmission mechanism carries the workpiece out of the first oven assembly 26 from the first discharge opening 217 after the workpiece is baked in the first oven assembly 26. Then, the workpiece enters the second transportation assembly 30 driven by the first discharge wheel 28 and the divert wheel 282. Meanwhile, the second pulley assembly 23 drives the second transmission belt 233 to pull the lower pulley 322 of the third pulley assembly 32 to rotate. The second driving wheel 363 is pulled to drive the second main driving shaft 361 and the second driven shafts 362 to rotate. The workpiece is carried into the second oven assembly 36 by the third conveyer belt portion 35, and is carried out of the second oven assembly 36 after the workpiece is baked in a substantially similar manner as that for the second transportation assembly. Lastly, the baked workpiece is transported to the discharge wheel 41 by the divert wheel 382.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A baking transmission mechanism, comprising:

a dustproof assembly including a box, a main transport wheel, a main conveyor belt and a drive unit, the main transport wheel and the drive unit being mounted on the box;

a first transportation assembly including a first oven assembly, a first feed wheel, a first discharge wheel, a first pulley assembly and a second pulley assembly; the first feed wheel and the first discharge wheel located at a top of the first oven assembly, the first pulley assembly and the second pulley assembly located on opposite sides of the first oven assembly; and a second transportation assembly including a second oven assembly, a second feed wheel, a second discharge wheel and a third pulley assembly, the second feed wheel and the second discharge wheel located at the top of the second oven assembly, and the third pulley assembly adjacent to the second pulley assembly; and wherein the main conveyor belt is transported into the first oven assembly via the main transport wheel and the first feed wheel and is transported out via the first discharge wheel, and then is transported into the second oven assembly via the second feed wheel, and is transported out via the second discharge wheel; the transmission of the main conveyor belt is achieved by which the drive unit drives the first pulley assembly, the second pulley assembly and the third pulley assembly;

wherein the first pulley assembly includes an upper pulley and a lower pulley coaxially arranged with the upper pulley;

wherein the second pulley assembly includes an upper drive pulley and a lower drive pulley coaxially arranged with the upper drive pulley, the first oven assembly includes a first main driving shaft and three first driven shafts, the first main driving shaft includes a first rotation wheel and a first drive wheel, a first transmission belt is coiled around on the first rotation wheel and the upper pulley, a first convection belt is coiled around the first drive wheel and the lower drive pulley.

2. The baking transmission mechanism as claimed in claim 1, wherein the drive unit includes a main drive wheel and a drive motor for driving the main drive wheel, and a main drive belt is mounted on the main drive wheel, and the main drive belt is sleeved around the main drive wheel and the lower pulley to drive the upper pulley of the main drive to rotate.

3. The baking transmission mechanism as claimed in claim 2, wherein the third pulley assembly includes an upper pulley and a lower pulley, a second transmission belt is coiled around the upper drive pulley of the second pulley assembly and the lower pulley of the third pulley assembly; the second oven assembly includes a second main driving shaft and three second driven shafts, the second main driving shaft has a second rotation wheel and a second drive wheel, and a third transmission belt is coiled around the second rotation wheel and the upper pulley of the third pulley assembly.

4. The baking transmission mechanism as claimed in claim 3, wherein the first transportation assembly includes a first housing, the first housing includes a first bottom wall and a first top wall, the first feed wheel is mounted on the first top wall, a baffle is mounted on the first top wall, the baffle includes a first feed opening and a first discharge opening, the first discharge wheel is mounted on the first top wall.

5. The baking transmission mechanism as claimed in claim 4, wherein the second transportation assembly includes a second housing which includes a second top wall and a second bottom wall, the second feed wheel is mounted on the second top wall, a baffle is mounted on the second top wall, the baffle of the second top wall includes a second feed opening and a second discharge opening, the second discharge wheel is mounted on the second top wall.

6. The baking transmission mechanism as claimed in claim 5, wherein the first oven assembly is mounted on the bottom wall of the first housing, the first pulley assembly and the second pulley assembly are located on both sides of the first oven assembly, and the second housing is connected with the first housing, the first oven assembly is mounted on the bottom wall of the second housing, and the third pulley assembly adjacent to the second pulley assembly and the fourth pulley assembly are located on both sides of the second oven assembly.

7. The baking transmission mechanism as claimed in claim 6, wherein the box includes two side plates, a bottom plate and a separator which are located between the two side plates, the drive unit is mounted on the bottom plate, and one of the two side plates is connected with the side wall of the first housing.

8. The baking transmission mechanism as claimed in claim 7 wherein a support table is mounted on the side plate of the box, and the main transport wheel is mounted on the support table.

9. The baking transmission mechanism as claimed in claim 8, wherein a support is mounted on the outside of the second box, the discharging wheel is located to the support and forms a circular transport belt mechanism with the main transport wheel by tensioning at the same time.

10. The baking transmission mechanism as claimed in claim 1, wherein the main conveyor belt includes a first conveyor belt portion, a second conveyor belt portion, and a third conveyor belt portion, and the first conveyor belt portion is connected to the second conveyor belt portion, the second conveyor belt portion is connected to the third conveyor belt portion.

11. The baking transmission mechanism as claimed in claim 10, wherein the first conveyor belt portion is defined as a portion of the main conveyor belt located in the dustproof assembly, and the second conveyor belt portion is defined as a portion of the main conveyor belt located in the first transportation assembly, the third conveyor belt portion is defined as a portion of the main conveyor belt located in the second transportation assembly.

* * * * *